May 13, 1941.  R. J. WOODS  2,242,201
HINGED MOUNT
Filed Dec. 30, 1938  2 Sheets-Sheet 1
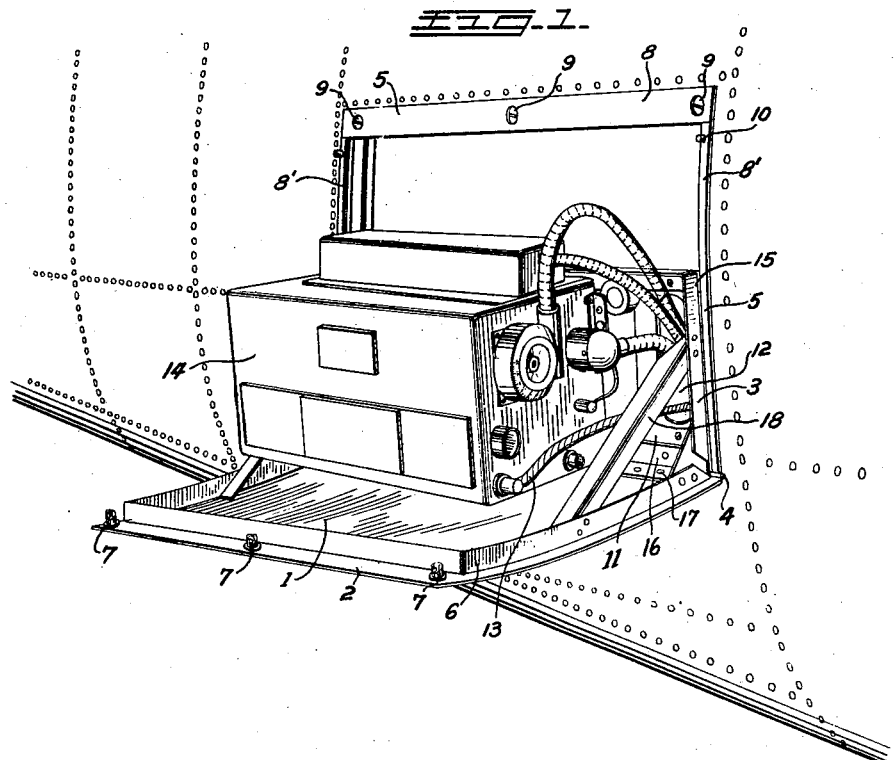
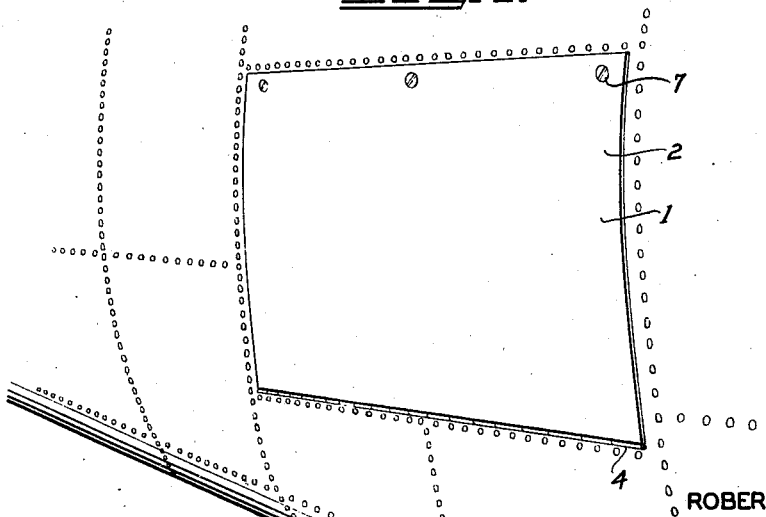
Inventor
ROBERT J. WOODS
By Semmes, Keegin & Semmes
Attorneys

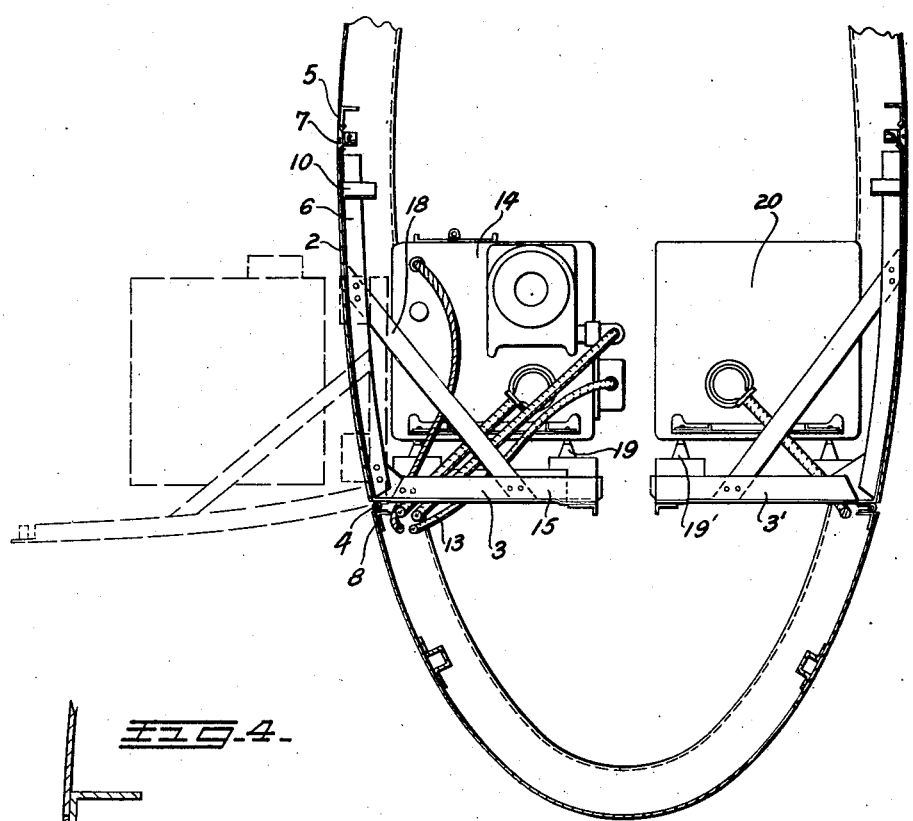
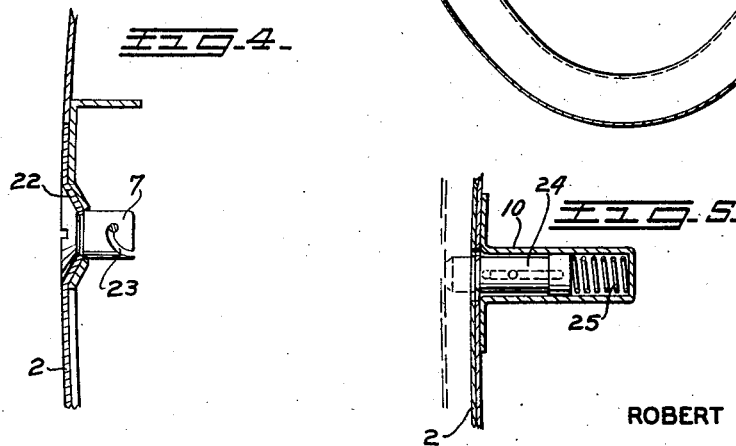

Patented May 13, 1941

2,242,201

UNITED STATES PATENT OFFICE 2,242,201

HINGED MOUNT

Robert J. Woods, Grand Island, N. Y., assignor to Bell Aircraft Corporation, Buffalo, N. Y., a corporation of New York Application December 30, 1938, Serial No. 248,633

3 Claims. (Cl. 244—129)

This invention relates generally to airplane construction, and more especially to the mounting of airplane equipment, such as radio transmitters and receivers, in such a manner as not to be an obstruction to the pilot but providing means whereby complete access may be easily had to the equipment for adjustment and repair.

One of the objects of my invention is to provide a door which is designed so as to form a portion of the exterior skin of an airplane when in closed position.

Another object of my invention is to provide a door provided with a base upon which may be mounted suitable airplane accessories.

A further object of my invention is to provide a hinged means for mounting an airplane accessory, the operation of which will transport the accessory from the interior to a position accessible from the exterior of the airplane.

With these and other objects in view, my invention generally embraces the concept of providing a hinged mount comprising an integral door and base upon which may be mounted an airplane accessory. The door is designed so that it will be flush with the exterior surface of the airplane when in closed position.

The base is provided with suitable resilient mountings to which may be attached any suitable accessory, such as a radio transmitter or receiver. Due to the angular relationship between the base and the interior surface of the door, the accessory is brought out of the airplane when the door is opened. This hinged movement of the accessory provides an easy way of installing and making adjustments and repairs.

While for purposes of illustration I have shown the door mounted in the rear portion of the fuselage of an airplane, it is obvious that it could be mounted in any desired portion of the fuselage or in nacelles or wing structure.

In the drawings:

Figure 1 discloses a fragmental view in perspective of a portion of the fuselage of an airplane showing the door in open position.

Figure 2 is a view similar to that shown in Figure 1, showing the door in closed position.

Figure 3 is a cross-sectional view of the fuselage of an airplane, in which doors are shown in closed position on opposite sides of the fuselage, and the open position of one of the doors is indicated by broken lines.

Figure 4 is a fragmental, cross-sectional view of a portion of the door and door frame disclosing a door fastener in operative position.

Figure 5 is a fragmental view partly in section of a spring plunger mounted on the frame of the door, which forces the door partially open when it is unfastened.

As best shown in Figure 1, my invention consists of a hinged mount, generally designated by the numeral 1, which comprises a door 2, provided with a base 3, which is hinged at 4 to a door frame 5.

The door 2 is made of sheet metal, the curvature of which corresponds to that of the portion of the skin of the airplane adjacent the door. This door is reinforced by angles 6 which extend around its inner periphery. Between the angle 6 and the upper extremity of the door are provided fasteners 7.

The frame 5 to which the door is movably attached by means of the hinge 4 is composed of fuselage stringers 8 and formers 8'. In the upper portion of the frame 5 are provided apertures 9 and door spring plungers 10. When in closed position, the angle 6 fits within the frame 5, thereby allowing the door 2 to form a flush surface with the surrounding portions of the skin of the fuselage.

The base 3, integrally formed with the door 2, consists of a platform 11 having cutaway portions 12 which minimize the weight and allow for the passage of the cables and controls 13 of the radio apparatus 14.

The platform 11 is provided with a stiffening flange 15 which extends around three of its sides. A flange member 16 is also provided which is attached to the edge of the platform 11 adjacent the door 2 and is rigidly connected to both the platform 11 and the door 2 by rivets or other suitable means, as shown at 17. Supporting strips 18 are provided on either side of the door. The opposite extremities of each of these strips are securely riveted to the flange 15 of the base 3 and an angle 6 of the door 2.

The platform 11 is provided with resilient mountings 19 which are provided with any suitable means of attaching an accessory to the mounting. For purposes of illustration I have shown a radio receiver 14 attached to the mounting 19 of one of the base members 3 and a radio transmitter 20 attached to the resilient mounting 19' of the base 3' mounted on the opposite side of the fuselage structure. In mounting these accessories, it should be noted that the cables and controls 13 pass through an aperture 12 near the hinge 4. This minimizes the movement of the controls 13 when the door is opened and closed.

As best shown in Figure 4, the fasteners 7 are carried by dimpled apertures 22 of the door 2 and are formed so that their heads will lie flush with the outer surface of the door. These fasteners are of conventional construction and are provided with helical slots 23 which are adapted to engage wires carried adjacent the apertures 9 in the frame 5. Of course, any other desired type of fastener may be used.

As best shown in Figure 5, the spring plungers 10 which are mounted on the frame 5 are provided with a bolt 24 which is actuated by a spring 25. When the door 2 is in closed position, the bolt 24 is retracted, thereby compressing the spring 25. The plunger 10 is held in this position until the fasteners 7 are released. This action allows the spring 25 to force the bolt 24 outwardly against the door 2, thereby forcing the door open for a short distance. This permits the door to be opened without utilizing a handle or other means which would increase the drag of the airplane.

In operation, when the door is open, the base 3 changes from a horizontal to a vertical position. This movement exposes the base 3 and the mountings 19 so that the accessory may be installed. If the base 3 is already carrying an accessory, this construction provides a hinged means by which the accessory may be readily hinged out of the airplane for adjustment or repair.

When the door is closed, the accessory is positioned entirely within the fuselage and the door forms a flush surface with the exterior skin of the airplane.

While for purposes of illustration I have disclosed my invention positioned in a fuselage of an airplane and carrying a radio transmitter and receiver, it is obvious that this door may be adapted for use in any part of an airplane structure and the base may be designed to carry any type of apparatus. It is, therefore, to be understood that the form of the invention shown is for purposes of illustration only, and that I intend to be limited only by the prior art and the scope of the appended claims.

I claim:

1. In a fuselage structure for an airplane, an accessory mount comprising a rectangular-shaped frame mounted in an aperture of the fuselage, a door pivotally mounted on the bottom portion of the frame, a base rigidly mounted on the inside of the door, said base forming a right angle with said door, stiffening flanges mounted on three sides of the door and of the base, support strips connecting the said base flanges to the door flanges, and resilient mountings positioned on the base, said mountings being adapted to secure an airplane accessory.

2. In a fuselage structure for an airplane, an accessory mount comprising a rectangular-shaped frame mounted in an aperture of the fuselage, a door and a base pivotally mounted on the bottom of the frame, said base forming a right angle with said door, a flange member connecting the base to the door, stiffening flanges mounted on three sides of the door and of the base, support strips connecting the said base flanges to the door flanges, and resilient mountings positioned on the base, said mountings being adapted to secure an airplane accessory.

3. In a fuselage of monocoque structure, an accessory mount comprising a rectangular-shaped frame mounted in an aperture in the skin of the fuselage, said frame being composed of fuselage stringers and formers, a door and a base pivotally mounted on the bottom portion of the said frame, said base being provided with cut-away portions and forming a right angle with said door, stiffening flanges mounted on three sides of the door and of the base, a pair of support strips connecting the said base flanges to the door flanges, and resilient mountings positioned on the base, said mountings being adapted to secure an airplane accessory.

ROBERT J. WOODS.